No. 848,750. PATENTED APR. 2, 1907.
I. KITSEE.
ELECTRIC TRANSMISSION OF INTELLIGENCE.
APPLICATION FILED JUNE 28, 1906.
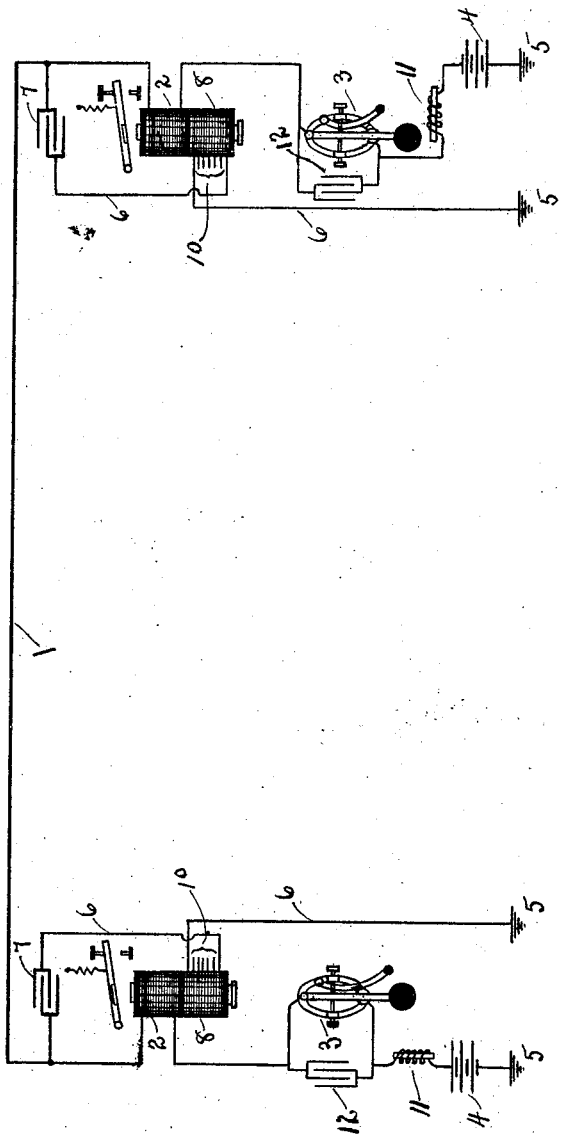

UNITED STATES PATENT OFFICE.

ISIDOR KITSEE, OF PHILADELPHIA, PENNSYLVANIA.

ELECTRIC TRANSMISSION OF INTELLIGENCE.

No. 848,750.   Specification of Letters Patent.   Patented April 2, 1907.

Application filed June 28, 1906. Serial No. 323,861.

*To all whom it may concern:*

Be it known that I, ISIDOR KITSEE, a citizen of the United States, residing at Philadelphia, in the county of Philadelphia and State of Pennsylvania, have invented certain new and useful Improvements in Electric Transmission of Intelligence, of which the following is a specification.

My invention relates to an improvement in electric transmission of intelligence. Its object is to counteract the inducing influence of neighboring wires on the receiving devices in the line of transmission.

In the drawing I have illustrated my invention as being adapted to a telegraphic system; but I have only illustrated this system so as to comprise for each terminal or station one transmitting-key, one translating device, such as a sounder, and one battery. In other wards, I have illustrated my invention as comprising only a simplex system of telegraphy; but it is understood that other devices, such as are embraced in duplex or quadruplex systems, may be inserted and supplied with my invention.

Telegraphing is most generally accomplished to-day with the aid of a straight or voltaic current, and it is well known that static means—such, for instance, as a condenser—are opaque to this current—that is, do not permit this current to flow over a circuit wherein they are inserted. It is equally well known that induced impulses readily flow through a circuit comprising such means as condensers. On the other hand, a straight or voltaic current flows readily through a circuit embracing an inductive resistance; but to the flow of induced impulses an inductive resistance acts as an impedance and if of high enough inductive value as an entire bar to the flow of same.

The drawing represents in diagrammatic view a telegraphic system embodying my invention.

1 is the line of transmission. In this line is connected in series the coil 2 of the translating device, here shown as a sounder in conventional sign. In this line is also inserted the key 3, shunted by condenser 12, the inductive resistance 11, and the battery 4, which is grounded at 5. To the line of transmission 1 is also connected the condenser 7, and this condenser is connected through wire 6 with the coil 8, grounded also at 5. The translating device therefore, which is usually only provided with one coil, is here provided with the coils 2 and 8, the coil 2 connected in series to the line proper and the coil 8 connected, as stated above, through wire 6 with the condenser 7 and through same with the line. The line therefore is at each station provided with two paths, one path including the high inductive resistance 11 and the other path including the condenser 7, each of these paths embracing one coil of the electromagnet serving as a translating device. The first-named path—that is, the path including the inductive resistance—is entirely transparent to the flow of a straight or voltaic current, but is to a great extent opaque to the flow of an induced impulse. The second path—that is, the path with the condenser—is entirely opaque to the flow of a voltaic current, but is fully transparent to the flow of an induced impulse.

It is now supposed that the line 1 is in the region of a circuit carrying a high-tension current, either variable or alternating, and the variation or alternation of this current induce impulses in the line of transmission 1. These impulses will flow over the line alternately in opposite direction and will flow through the coils 2 of the translating devices inserted in this line. In normal cases—that is, if the translating devices were only provided with the coil 2—the impulses will energize the core alternately in opposite direction and the armature would be actuated. To overcome the energizing action of these induced impulses, it is necessary to simultaneously energize the core oppositely, thereby neutralizing the effect of the flowing impulses. In my arrangement the coil 8 serves this purpose, and this coil is connected to the line in a manner so as to oppose the magnetizing influence of the first coil or coil 2. Induced impulses flowing over the line will, seeking the path of least resistance for them, flow in a greater part through the branch containing the condenser 7 and the coil 8, and only a small proportion of said impulses will flow through the path embracing the coil 2 and the high resistance 11. The coil 8 is therefore provided with the means 10, so as to adjust its value for the purpose of balancing its magnetizing effect.

The operation of this system is as follows: When the line is idle—that is, all keys are closed—the current from the batteries 4 will flow over the line through the path embracing the inductive resistance 11, key 3, and coil 2, but will not flow to the ground through the circuit embracing the condenser 7 and wire 6, for the reason, as stated above, that the condenser is an effectual bar to the flow of a straight or voltaic current. At the same time the neighboring wire will induce impulses in the line. These induced impulses will flow over the line, but will divide at the terminal in inverse proportion to the value of the inductive resistance 11—that is, the higher this inductive value the less of the induced impulses will flow through the circuit embracing the coil 2 and the more of these impulses will flow through the circuit embracing the condenser 7 and coil 8. As the coil 8 can be adjusted so as to just neutralize the effect of coil 2, it is obvious that the device itself will remain at rest and will be ready to respond to any variation of the straight or voltaic current. It is now supposed that the operator on the right-hand side desires to transmit messages. He opens his key and operates the same in the usual manner. The making and breaking of the circuit containing the battery 4 will operate the translating device in the usual manner independently of the fact that induced impulses are flowing over the line and through the coil 2. The keys 3 are provided with the shunt including the condenser 12, for the reason that otherwise should the key be opened only one path would remain for the induced impulses, and the magnetizing effect of the coil 8 would therefore be increased to an extent so as to injuriously effect the translating device.

Having now described my invention, what I claim as new, and desire to secure by Letters Patent, is—

1. In a telegraph system, the combination with the line, of a return-conductor, two branch circuits connected between said line and said return-conductor, one branch conductively connected to the line and including the winding of a receiving instrument and a key, the other branch connected from said line to said return-conductor independently of said first branch and containing a second winding of said receiving instrument and a condenser.

2. In a telegraph system, the combination with the line, of a return-conductor, two branch circuits at each station connected independently of each other between said line and said return-conductor, a receiving instrument having oppositely-disposed windings, one winding conductively included in one branch with a transmitter, the other winding included in the other branch with a condenser, and means for adjusting the effect of said second winding.

3. In a telegraph system, the combination with the line, of a return-conductor, two independent branches at each station from said line to said return-conductor, one branch conductively connected to the line and containing a winding of a receiving instrument and a transmitter of direct current, the second branch including a second winding of said receiving instrument disposed oppositely to said first-mentioned winding, and a condenser.

4. In a telegraph system, the combination with the line, of a return-conductor, two independent branch circuits between said line and return-conductor at each station, a receiving instrument having a winding connected in one branch with a source of direct current and a key, a second winding of said receiving instrument connected in the other branch with a condenser and disposed oppositely to said first-mentioned winding.

5. In a telegraph system, the combination with the line, of a return-circuit, two branch circuits at each station from said line to said return-circuit, one branch conductively connected to the line and containing the winding of a receiving instrument and a transmitter, the second branch including a winding of said receiving device connected in opposition to said first-mentioned winding, and a condenser.

6. In a telegraph system, the combination with the line, of a return-circuit, and two branches from said line to said return-circuit at each station, one branch conductively connected to said line and containing the winding of a receiving device, an inductance and a transmitter, the second branch including a winding of said receiving device oppositely disposed with respect to said first-mentioned winding, and a condenser.

7. In a telegraph system, the combination with the line, of a return-circuit, two branches from said line to said return-circuit at each station, one branch conductively connected to said line-circuit and including the winding of a receiving device, a transmitter, and an inductance, the second branch including a winding of said receiving device disposed oppositely to said first-mentioned winding, and a condenser.

8. In a telegraph system, the combination with the line, of a return-circuit, two branches from said line to return-circuit at each station, one branch conductively connected to said line and including a winding of a receiving instrument, a source of energy and a key, the other branch including the winding of said receiving device disposed oppositely to said first-mentioned winding, and a condenser.

9. In a telegraph system, the combination with the line, of a return-circuit, two branches between said line and return-circuit at each station, one branch including the winding of a receiving device, a source of energy, a key, and an inductance, the other branch including a winding of said receiving device disposed oppositely to said first-mentioned winding, and a condenser.

10. In a telegraph system, the combination with the line, of a return-circuit, two branches between said line and return-circuit at each station, one branch including the winding of a receiving device, a source of energy, and a key, a condenser in shunt to said key, said second branch including a winding of said receiving device disposed oppositely to said first-mentioned winding, and a condenser.

11. In a telegraph system, the combination with a line conductor, of a return-conductor, a receiving instrument and a transmitter at each station, a winding of said receiving instrument conductively connected to the line conductor and to the return-conductor, and means for rendering ineffective impulses induced in said line conductor by another circuit comprising a second winding on said receiving instrument connected in circuit with a condenser between said line and return conductors independently of said transmitter.

In testimony whereof I affix my signature in presence of two witnesses.

ISIDOR KITSEE.

Witnesses:
  ALVAH RITTENHOUSE,
  MARY C. SMITH.